(12) United States Patent
Harris

(10) Patent No.: US 8,805,731 B2
(45) Date of Patent: *Aug. 12, 2014

(54) CONSTRUCTION PROJECT SUBMITTAL MANAGEMENT

(76) Inventor: Elbert Harris, Leawood, KS (US)

( * ) Notice: Subject to any disclaimer, the term of this patent is extended or adjusted under 35 U.S.C. 154(b) by 827 days.

This patent is subject to a terminal disclaimer.

(21) Appl. No.: 12/123,998

(22) Filed: May 20, 2008

(65) Prior Publication Data

US 2008/0288364 A1 Nov. 20, 2008

Related U.S. Application Data

(60) Continuation-in-part of application No. 11/370,343, filed on Mar. 8, 2006, now abandoned, and a continuation-in-part of application No. 11/423,036, filed on Jun. 8, 2006, now abandoned, which is a division of application No. 10/693,590, filed on Oct. 24, 2003, now Pat. No. 7,062,514.

(51) Int. Cl.
*G06Q 40/00* (2012.01)
*G06Q 30/06* (2012.01)
*G06Q 30/08* (2012.01)
*G06Q 10/08* (2012.01)

(52) U.S. Cl.
CPC ............ *G06Q 30/08* (2013.01); *G06Q 30/0637* (2013.01); *G06Q 10/0875* (2013.01); *G06Q 30/0611* (2013.01)
USPC .............................................. 705/35; 705/38

(58) Field of Classification Search
USPC .......................................................... 705/35
See application file for complete search history.

(56) References Cited

U.S. PATENT DOCUMENTS

| | | | | |
|---|---|---|---|---|
| 5,189,606 A | * | 2/1993 | Burns et al. | 705/10 |
| 5,893,098 A | * | 4/1999 | Peters et al. | 1/1 |
| 6,393,410 B1 | * | 5/2002 | Thompson | 705/37 |
| 6,446,053 B1 | * | 9/2002 | Elliott | 705/400 |
| 6,842,760 B1 | * | 1/2005 | Dorgan et al. | 1/1 |
| 6,859,768 B1 | * | 2/2005 | Wakelam et al. | 703/1 |
| 7,089,203 B1 | * | 8/2006 | Crookshanks | 705/37 |
| 7,117,162 B1 | * | 10/2006 | Seal et al. | 705/9 |
| 7,321,864 B1 | * | 1/2008 | Gendler | 705/7.15 |
| 7,330,821 B2 | | 2/2008 | Wares | |
| 7,548,883 B2 | * | 6/2009 | Lawrence | 705/38 |
| 2003/0023677 A1 | | 1/2003 | Morison Zuill et al. | |

OTHER PUBLICATIONS

Slapikoff, Rob, et al., "The ABC's of using the ACL", DeveloperWorks, Apr. 1, 1998, [retrieved from Internet on Nov. 21, 2011] http://ibm.com/developerworks/lotus/library/ls-Using_the ACL/.

J. Mark Andersen, Kathy Cheak & John Jurewicz, Managing Projects Online, Article from American School & University Website: http://asumag.com/mag/university_manging_projects_online/, Nov. 1, 2000, 4 pages.

(Continued)

*Primary Examiner* — Kirsten Apple
(74) *Attorney, Agent, or Firm* — Kutak Rock LLP; Bryan P. Stanley

(57) ABSTRACT

A network based construction project management system. The system includes network accessible databases of project information including drawings and specifications. The system allows for varying amount of access for various user including general contractors, subcontractors, architects and project owners. The system allows for the effective creation, management and long term accessible storage of project submittals.

26 Claims, 3 Drawing Sheets

(56) References Cited

OTHER PUBLICATIONS

W. Gary Craig, White Paper on the Use of ProjectEDGE for the Management of the Planning, Design, Construction and Operations of Hydroelectric Generating Plans, Aug. 1, 2000, 9 pages.

ProjectEDGE: A Collaborative Project Solution for all Owners and Managers, ProjectEDGE Brochure, 4 pages (Undated).

A Project Solution for Owners and Managers, Article from ProjectEDGE Website: http://web.archive.org/web/20020812031030/www.onlineproject.com, Liverpool, NY, 1993-2001, 19 pages.

Stephen P. Mead, Developing Benchmarks for Construction Information Flows, Article from Journal of Construction Education, Fall 2001, vol. 6, No. 3, pp. 155-166, 11 pages.

Antti Lakka, Kristiina Sulankivi and Mary Luedke, Features and Capabilities in the Concurrent Engineering Environment, Technical Research Centre of Finland, Proce Project: Intermediate Report 1, Mar. 15, 2001, 31 pages.

Introducing PRZM, PRZM Orientation PowerPoint Presentation, 22 pages (Undated).

Learning PRZM Online, PRZM Online Learning Website: https://przm.apps.uillinois.edu/Tutorial/index.htm,2001, The University of Illinois Board of Trustees.

"Construction Submittal and Shop Drawing Liability" by Matt Ostanik, dated Oct. 15, 2007, 7 pages.

Search results (including waybackmachine) for URLs cited in Request, 3 pages.

Web-Based Project Management Applications in Construction, Muhamad Abduh and Biemo W. Soemardi, Department of Civil Engineering, Institut Teknologi Bandung, Bandung 40132, Indonesia.

Screenshots of Alleged Prior Art Included in Re-examination Submission.

Reexamination No. 95/001478, Reexamination Certificate No. 7,062,514 Issued Mar. 7, 2013.

\* cited by examiner

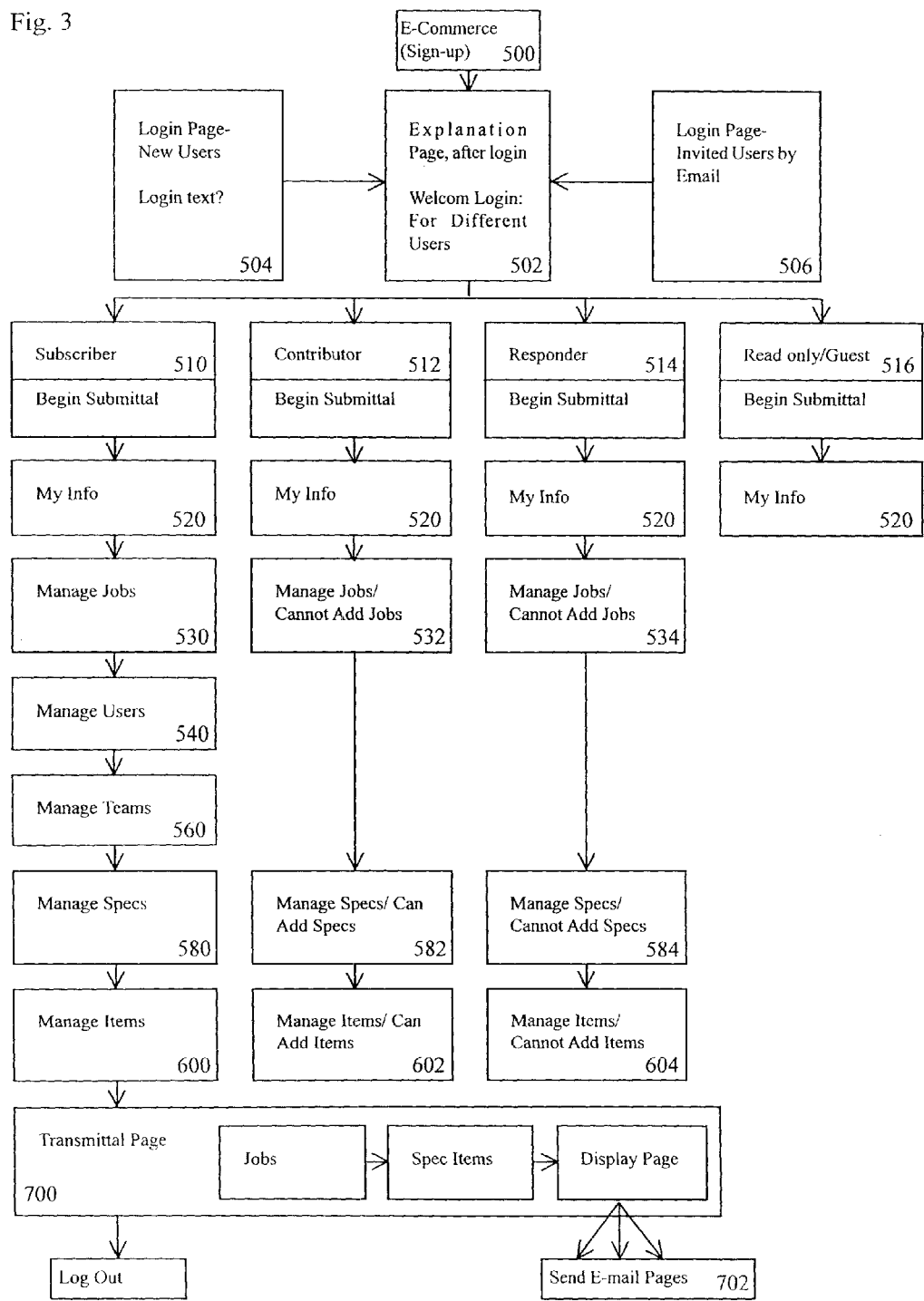

CONSTRUCTION PROJECT SUBMITTAL MANAGEMENT

This is a continuation-in-part of application of U.S. application Ser. No. 11/370,343 filed Mar. 8, 2006 now abandoned and of U.S. application Ser. No. 11/423,036 filed Jun. 8, 2006, now abandoned which is a divisional of U.S. application Ser. No. 10/693,590 filed Oct. 24, 2003 now U.S. Pat. No. 7,062,514 issued Jun. 13, 2006, the disclosures of which are incorporated herein by reference in their entireties.

BACKGROUND OF THE INVENTION

In the construction industry it is desirable to effectively manage construction projects. In construction a general or prime contractor, herein after general contractor, must manage a variety of ongoing projects. Overlapping the projects is the need to manage relationships with many individuals including project owners, architects, sub-contractors, material suppliers and inspectors.

One of the critical functions in a construction project is to manage the submittal of information and materials to meet specifications. In almost all construction projects it is typical for the architect and engineering design firms to determine a project design and to set the specifications for materials to meet the design parameters. Once the specifications are set, contractors and subcontractors working on the project must make submittals of material specifications to meet the requirements set. A big job for those involved with a construction project is to manage these submittals and to receive timely approvals to requests to keep a construction project moving forward.

In today's construction environment large fines and penalties can be exacted against entities that fail to act in a timely and efficient manner. These fines can lead to litigation associated with when submittals were made and who is responsible for delays ("submittal information"). In many cases stacks of files and paperwork must be stored for years by each entity involved with a project to create a paperwork trail of what happened when ("submittal history"). With fines and the threat of litigation, documentation has become a critical element for the contractor who plans to succeed in managing construction projects.

U.S. Pat. No. 6,038,547 shows construction management software designed to assist in tracking job completion and payments to subcontractors for percentage of work completion. Use of this software by a general contractor would solve some problems associated with project management. This software does not offer assistance to the contractor or others in tracking the process of creating, tracking and storing submittals and submittal information.

U.S. Pat. No. 6,092,050 offers a software to develop bids and to manage the scheduling of projects. Again this software does not propose to manage submittals and does not provide a networked solution to project management.

U.S. Pat. No. 6,446,053 provides a networked system of developing and submitting a bid proposal for a construction project. This system primarily allows the user to develop a project on line and to store it so that contractors can access and bid on the job. The system does not allow the user to create, manage or store submittals concerning material specifications of the project.

U.S. Pat. No. 6,393,410 provides a networked construction management system. The system stores shop drawings and project specifications on line in such a way that professionals in the construction industry can purchase project plans on-line and can submit proposals on the projects. Again the system does not allow for creation, management or storage of submittals made in the process of completing a construction project.

As can be seen there is a need for a networked system that allows the range of construction professionals to be involved in the creation of submittals, the management of those submittals and the storage of submittal information for future use or sale.

SUMMARY OF THE INVENTION

The present invention relates to a networked system that brings together the various professionals and suppliers that might be involved in creating, managing and storing the plurality of material specification submittals associated with a construction project. The system provides for network access to the system for those professionals that might need it. The system provides for variable access depending upon the need an individual might have in a project.

In another aspect of the system it allows for sub-contractors to make submittals over the Internet (or any other suitable network). Those submittals can be submitted on-line to an architect for approval, denial or for comment. In one preferred embodiment of the system, submittals, requests for payment, requests for information, requests for quotation, invoicing, prevailing wage rate reports, union wage rate reports, certification for payment, change orders, or other similar documents may be submitted from the field via a PDA or other portable or wireless device. The system can enable users to order materials and work automatically through the system upon approval being received and the system can automatically authorize payments to all parties upon approval of a submittal being received.

In still another aspect of the invention a submittal history is stored. That submittal history is then available to anyone who has access to it during the project and for a time after the project is completed. In yet another aspect of the invention, a back up system and/or other security features are utilized to increase reliability and user security.

The foregoing and other objects are intended to be illustrative of the invention and are not meant in a limiting sense. Many possible embodiments of the invention may be made and will be readily evident upon a study of the following specification and accompanying drawings comprising a part thereof. Various features and subcombinations of invention may be employed without reference to other features and subcombinations. Other objects and advantages of this invention will become apparent from the following description taken in connection with the accompanying drawings, wherein is set forth by way of illustration and example, an embodiment of this invention and various features thereof.

BRIEF DESCRIPTION OF THE DRAWINGS

A preferred embodiment of the invention, illustrative of the best mode in which the applicant has contemplated applying the principles, is set forth in the following description and is shown in the drawings and is particularly and distinctly pointed out and set forth in the appended claims.

FIG. 3 shows a flow chart of how the system is managed.

DETAILED DESCRIPTION OF THE DEVICE

As required, a detailed embodiment of the present invention is disclosed herein; however, it is to be understood that the disclosed embodiment is merely exemplary of the principles of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
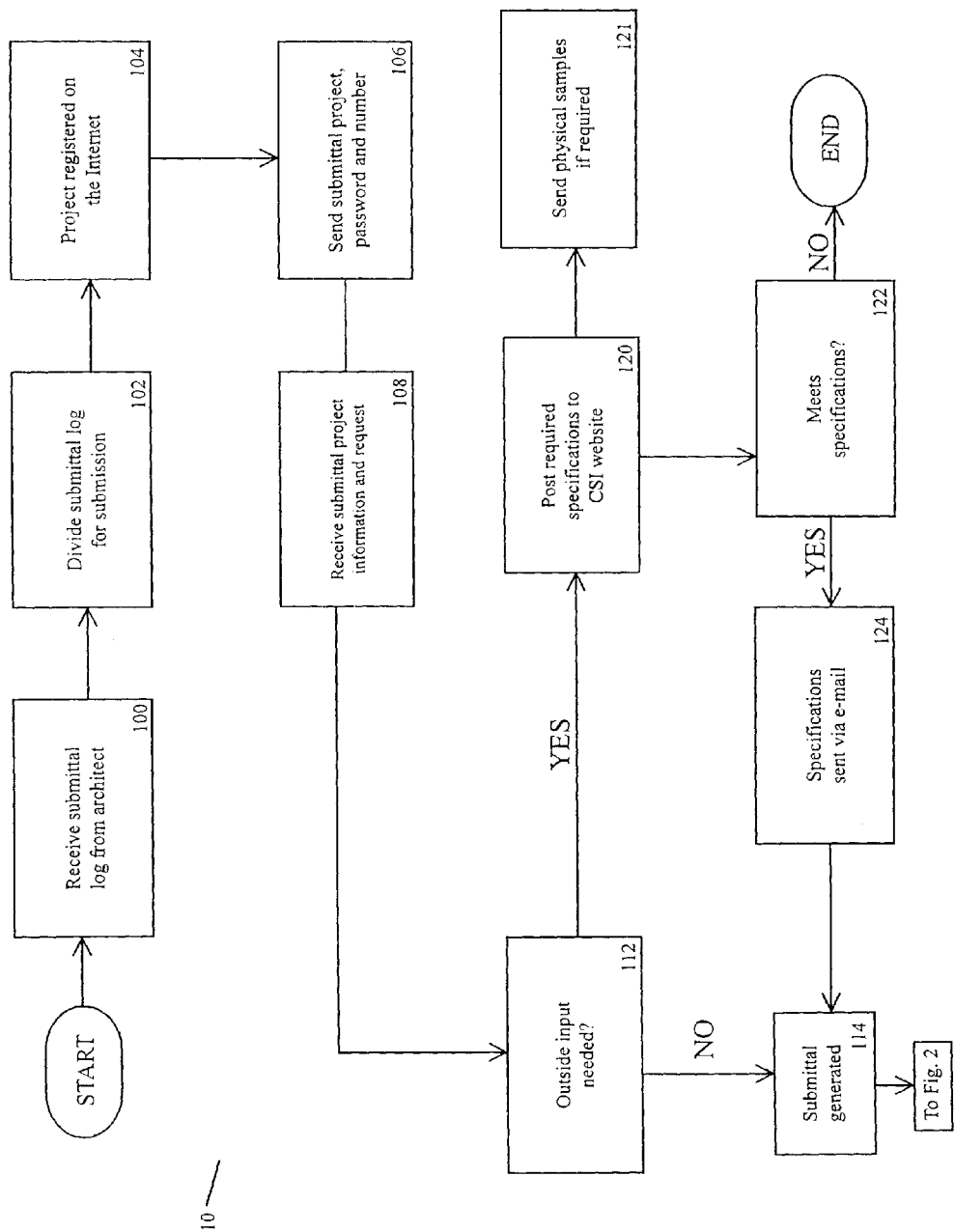
FIG. 1 shows a portion of a flow chart of the submittal management system.

FIG. 1 shows a flow chart of the system 10 for submittal process management, the flow chart of FIG. 1 tracks a single submittal requirement through the system 10. The system 10 begins after an architect has developed a project plan, and a general contractor has bid on and received the contract to build a project. The initial step in the submittal process can be for the architect to send the general contractor the submittal log 100. The submittal log contains all the requirements and specifications that must be met by various components used in a construction project. For a multi-story building the submittal log will contain thousands of requirements for the total building. The submittal log along with project prints, specifications and other contract documents can be transferred electronically to the general contractor who can make those documents available to project professionals selectively through a hosted Internet site.

After the general contractor receives the submittal log, the requirements will be divided up 102 and stored in a network accessible database. The requirements are generally divided along the lines of trades such as plumbing, structural, electrical, heating and ventilating and so forth. The project is then posted 104 to a computer network such as the Internet so that the subcontractors of the various trades can begin to download the submittal requirements for their portion of the project. Each person involved in the project will be emailed a password 106 that will give them selective access to the system 10. In addition to the general and sub contractors (subs) the architect, project owner and others can have selective access. Once a project is posted the subs will receive 108 an email, automatically sent by the system 10, alerting them to the availability of project information. It is important at this stage that the various trades have the ability to move forward on the project quickly.

The subcontractor will then evaluate 112 the need for additional information in order to make a submittal. If no outside assistance is needed, the sub can use the system 10 to go ahead and generate 114 a submittal based on the requirements of their portion of the project. If however additional information is needed, which is often the case, then the sub can go to a variety of specification web sites 120. For example, the sub might use the system 10 to post a requirement with a supplier that has access to the system 10. That supplier web site 120 could send the sub information by which the sub could generate the submittal 114, or the system 10 could even post the submittal 114 for the sub. If the supplier is to send info for a submittal to a sub, the system 10 can check 122 that the specifications meet the submittal requirement posted. If in fact the specification check 122 of the supplier's product and the submittal match then the submittal information can be forwarded electronically either to the sub to generate the submittal or the submittal can be sent directly by the supplier for the sub. In situations where a physical sample must be sent 121, such as carpet or paint swatches, the supplier can send these directly to the general contractor, sub, architect and owner as desired. An email can be sent automatically alerting those in the system 10 that physical samples are coming.

In a preferred embodiment of the instant invention, the submittal 114 generated and/or posted by system 10 are in a standardized format such as PDF, Word, xml, AGCxml (or other xml format now known or hereafter developed), etc. Nevertheless, it will be appreciated that other formats may be utilized without departing from the spirit and scope of the instant invention.

Figure 2:
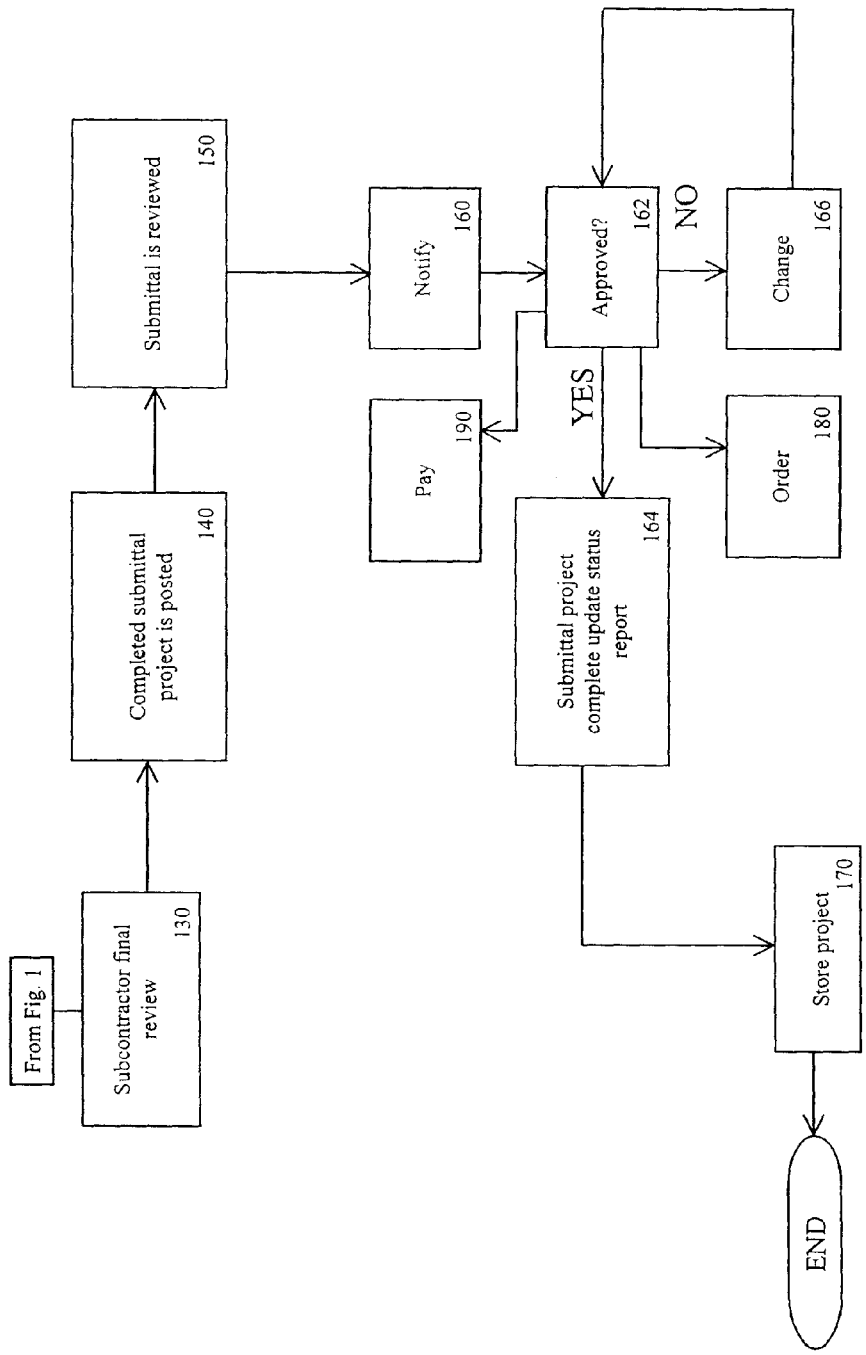
FIG. 2 shows the remaining portion of the flow chart from FIG. 1.

FIG. 2 shows a continuation of the system 10 flowchart from FIG. 1. The subcontractor will conduct a review of the completed submittal 130, and make any changes required. Then the completed submittal can be stored and posted 140 to an Internet web site. Once a submittal is posted 140 it can be reviewed in review process 150 by various professionals involved in the project including typically the architect, general contractor and project owner. During the review process 150 suggestions can be posted to submittal database 600 (FIG. 3) on the web site. For example, the owner might post a question for clarification. After review 150 the next step can be for the submittal to receive approval 162, typically from the project architect or engineer. If not approved then the subcontractor could need to revise the submittal based on comments posted to the electronic web site database. Electronic notice 160 of a submittal acceptance or rejection can be sent via the system 10. Once a submittal is approved, it is submitted to the system 10 and updated as complete 164 in the system 10 and posted as approved on the web site 170 and continues to be available on a selected basis until after the completion of the project. When a project is approved 162, the system 10 can be set to automatically order materials approved, for example an order 180 for carpet that has been approved, could automatically be sent to a supplier. The approval can also automatically approve payment 190 to a subcontractor for materials and work to be done. Once a construction project is complete the submittal archive (submittal history) could be stored and be available for future use on a fee basis. For example if a question arises 2 years after a project is completed then a contractor may still be able to download submittal information for a fee.

FIG. 3 provides a view of the system 10 from the perspective of management of the system 10. To begin the system operation process, a general contractor will signup 500 on the system 10. A fee might be collected from the subscriber 510 at this point via electronic means or the contractor might pay a one time subscription fee and have access to the system 10 for a period of time. Alternatively, system 10 may include a counter to track the number of submittals of each user (i.e. each time a user requests approval of a submittal document), and deduct charges from a prepaid account for each user, depending upon what transactions incur charges and how much. A system user that prepays an account may set a threshold level in which the system automatically notifies the user (such as via email) that the user's prepaid account is almost depleted. The amount prepaid and the user's desired threshold level(s) may be stored in one or more databases accessed by system 10. A user may access such databases to reset threshold levels and/or check account balances. The general contractor is then considered by the system to be a subscriber and will then be directed to welcome pages 502, the contractor can at this point enter a project (job) and can enter and store information about the various project users who will have selective access to the project information. New users 504 and those 506 directed to the system 10 by emails will also go through a welcome process that may include instructions for using the system, a password requirement and a fee process.

In the example shown four system user access points are identified a subscriber 510, a contributor 512, a responder 514 and a guest 516 access points. The subscriber 510 access point sets the various levels of access that users would have based on these four choices. In a typical project there might actually be a dozen or more system user access points on a given project but these four access points 510, 512, 514, and 516 show the range of different system and project access that is being contemplated. An access point would typically be a computer having access to a network containing the system 10. In a preferred embodiment, a PDA or other wireless or portable device may be an access point. In several such embodiments a specialized software application is utilized by the PDA to access system 10, or an Internet Site to which submittals are posted is specially formatted to allow PDA access. It will be appreciated that access to the network by the computer or PDA can be accomplished through any telecommunications technology now known or hereinafter developed, such as cable, DSL, GSM, CDMA, WiMAX, etc. In a preferred embodiment of the PDA, WiMAX is used as the telecommunications technology.

In the typical project the subscriber 510 access point would be the general contractor in charge of the entire project. The contributor 512 access point would typically be individuals contributing submittals in completion of project requirements and would normally be trades subcontractors. The responder 514 access point might be a project engineer or architect and the guest 516 access point would typically be a representative of the project owner.

The subscriber 510 has access to enter and store online available information about himself in a my info 520 database. The my info 520 database might include information about the subscriber such as contact information, role in a project or about past projects and credentials. The my info 520 database can be posted in several different jobs so that a single posting will keep several jobs updated. The my info 520 database is a common process that all users will be able to fill out and store information on themselves. Thus there may be my info 520 data for the architect, general contractor, subcontractors, owners, suppliers and regulators on a project.

The subscriber 510 has access to manage jobs database 530 and as mentioned a subscriber 510 may have many jobs at various states of completion and ultimately may have an archive of completed jobs as well. So a subscriber 510 can choose to manage jobs and this choice will allow the subscriber 510 to post information about a job that will become available to some or all users. The subscriber 510 can enter people into a job database and by doing so give them access to the job information. The subscriber 510 can enter specifications that apply to the certain job so that users can access information on submittal requirements and so that requirements can be received 108 by subcontractors. This database can contain information such as job drawings. The subscriber 510 can choose to automatically send an email to some or all users concerning changes made in job data. The manage jobs database 530 function also allows the subscriber 510 to add additional jobs to the system 10.

The subscriber 510 has the ability to manage users 540. This function allows the subscriber 510 to track submittals from any user. This function also allows the subscriber 510 to edit information about a user and to enter notes about the user. Notes could be automatically tabulated such as a report on how many jobs a subcontractor has, how many days behind or ahead the contractor is as well as notes on the number of submittals a subcontractor needs to submit on one or all jobs and how many submittals the subcontractor may have that are overdue. This function can automatically contact the subcontractor on the information above such as automatic notification if a submittal is past due.

The manage teams 560 function is similar to the manage user function 540 but allows the subscriber 510 to put together teams that may be on the same job or that may have a common concern outside any given job. An example would be a group of plumbing contractors concerned about a new city ordinance that wish to form a discussion group and post messages automatically distributed to all members of the team. Like the manage users function 540, this manage teams function 560 can automatically notify all members of a team that a submittal is past due.

The manage specification 580 function is where the original requirements for a job are posted to the system 10. This function provides the subscriber 510 with a number of prearranged trade areas into which specifications may be categorized. For example, all electrical requirements would be placed into one category and ultimately these would be available automatically to the subcontractors that would need this information, and automatically sent email can make them aware that the information is available. Requirements can be loaded into each job from a list of standard requirements for a type of job where such a list exists. For example, a particular job may require doors of a certain fire rating and specs to meet these requirements could be pulled automatically from this function by entering the job name or job number.

Manage items database 600 is where the management and completion of the actual submittals occurs. In this function the subscriber 510 can review actual submittals and make comments on submittals sent or create submittals where needed. FIGS. 1 and 2 show the management of an actual submittal document that occurs within this manage items database 600. System 10 of the instant invention may be utilized in connection with various forms of submittals, including typical product data submittals and samples, redline drawings, shop drawings, change orders, and requests for information, as well as in connection with various other communications throughout the construction process, such as requests for payment, requests for quotation, invoicing, prevailing wage rate reports, union wage rate reports, certification for payment, etc. It will be appreciated that other types of submittals may be utilized without departing from the spirit and scope of the instant invention.

In a preferred embodiment in which system 10 is specifically designed to manage redline drawings, the system includes one or more databases for storing original and revised versions of drawings, including date/time and other information regarding each drawing/version. In still another embodiment, the system includes software that allows revised versions of drawings to be viewed simultaneously with the original version of the drawings such that the revised drawings are superimposed over the top of the original drawings. In one such embodiment, the features of the revised drawings can be shown in a different color or line quality so that changes can be more easily identified. Each version may be assigned its own color or line quality/weight, such that two or more versions can be viewed at one time. In a preferred embodiment, the software of the instant invention allows the user to add or remove overlaying versions as desired.

In a preferred embodiment system 10 is specifically designed to manage change orders that are agreed to by a building owner or architect while in the field. In such an embodiment system 10 includes one or more databases or database fields for storing information regarding the change order, such as date of the change, a description of the change, materials involved, time involved, whether it is necessary to extend the original estimated completion date, the price (or price/cost difference, if any) for the change, person authorizing the change, etc.

The contributor 512 has some of the same capability as the subscriber 510. The contributor 512 has the same my information capability 520. The contributor 512 has limited ability to manage jobs 532 in a portion of the manage jobs database 530, manage specs 582 in a portion of the manage specs database 580 and to manage items 602 in a portion of the manage items database 600. The contributor 512 has no ability to manage users or teams in this embodiment. This has the effect of forcing all correspondence and project information through the subscriber 510 and system 10 so that the subscriber 510 (general contractor) is aware of all aspects of the project process and so that a full record (submittal history) of all project activity is made. An alternative would be to give the contributor some limited ability to manage some users and teams related to their aspect of the overall project. The contributor 512 may need to pay to do this.

The contributors 512 limited ability to manage jobs is essentially the same as that for the subscriber 510 except that the contributor 512 can not add new jobs. The contributor can also manage specs 582. In this function the contributor can add specifications that he is aware of. The contributor 512 can also manage items 602 and this would be where the contributor would actually create and submit a submittal document.

In one embodiment in which a PDA (or other portable device) is utilized as an access point by contributors 512 to the system of the instant invention, the contributor is given more limited capabilities than are available through other access points utilized by the contributor, such as a desktop computer station. In the manner, the system can be made more convenient for use via a PDA. For example, in one such embodiment, when accessing system 10 via a PDA, the contributor is limited to only the manage items 602 portion of system 10. In this manner, contributor 512 can create submittals, redline drawings, create requests for information, create change orders, etc. via a PDA. This is particularly useful for situations in which the contributor needs information or to make changes while in the field and allows system 10 to maintain an archive/history of all communications and actions taken relating to a project. In a preferred embodiment system 10 is specifically designed to manage requests for information in an easy and efficient manner. In one such embodiment, when a contributor submits a request for information, an email notification is sent to the selected responder marked as urgent and/or high priority, so that the responder will respond more quickly, knowing that the response may be needed immediately to continue work on the project. This is particularly useful for requests for information that are made in the field.

In one preferred embodiment in which a contributor makes a change order via a PDA, the system will ask the contributor whether approval is required. If the contributor chooses no, the change order will be stored in the system, but will not require an approval response from responder 514 (discussed below). This is useful in situation in which a written change order has been signed in the field and the contributor merely desires to document the change through system 10.

The responder 514 is typically a project engineer or architect and mainly needs access to the system 10 to approve or to disapprove of a submittal. As such the responder 514 can enter my information 520 and can access manage job and manage spec information to get information to allow them to approve or disapprove or make remarks on a submittal under manage items 604. The guest 516 is a read only and as such can not enter any information or manage any project information.

In a preferred embodiment of the instant invention, system 10 is utilized to automatically approve payment 190 to a subcontractor for materials and work to be done or that has already been completed. In such an embodiment the request for payment is handled by system 10 in a manner similar to that of a submittal. The subcontractor, general contractor or other party desiring payment will create a request for payment in the same manner in which a submittal document is created and post the request for payment to the network for approval by the building owner, owner representative, architect, engineer or other "responder" as described above. In a preferred embodiment, a request for payment is treated slightly differently from a typical submittal document upon approval of the request for payment by the responder in that once the request for payment is approved, system 10 will notify (such as by sending an email, or otherwise posting a message) a person such as an accountant or accounts payable employee (payor) of the building owner of the approval of the request for payment so that payment can be completed by that person.

In one embodiment, the request for payment process may take place at multiple levels such that there might be multiple "responders" within a single construction project. For example, when creating and posting a request for payment, a subcontractor is provided an option through system 10 to select the system user to which the request for payment is to be submitted. A subcontractor creating a request for payment might select the general contractor as the person to whom the request is to be submitted, and the general contractor (although originally the "subscriber" for system 10) would become the responder for the request for payment and would thus have the ability to approve the request for payment in the manner discussed above. In a preferred embodiment, the request for payment and approval will be a "private" transaction between the requester and the appropriate responder. For example, in the context of a subcontractor requesting payment from the general contractor, the request for payment will only be accessible by that subcontractor and the general contractor, and only the subcontractor and general contractor will be notified regarding the posting of the request, approval or other postings relating to the particular request for payment. In this manner other parties (such as other subcontractors, the building owner, etc.) involved in the construction project will not be privy to more sensitive pricing information. In one such embodiment, a separate database (or databases) is used to store requests for payment as well as information regarding the parties (or system users) that are allowed to access the particular requests for payment.

In another embodiment, all (or certain) requests for payment by subcontractors/contributors will go through the general contractor/subscriber. Subcontractors will create requests for payment that will be emailed or otherwise electronically posted by system 10 to the general contractor for initial review and approval before final submission to the building owner. Once the general contractor has approved the request for payment, system 10 will forward or otherwise post the request for payment to the building owner/representative for final approval for payment.

In yet another embodiment of the invention, requests for payment are compared by system 10 to submittals that have already been approved, or to other project benchmarks that are stored in one or more databases of system 10, to monitor the progress of completion of the project. As is discussed above, in a preferred embodiment, requests for payment are stored in a separate database from submittals for easier comparison between requests for payment and submittals. Yet another database may be utilized for separate comparison benchmarks in addition to or in place of the comparison to submittals. In yet another embodiment, a separate database may be utilized to store information regarding the particular system users that are allowed access to particular files in the requests for payment database, so that access to requests for payment and approvals. In still another embodiment, one or more databases may be utilized to track whether or not a request for payment has been made for a particular submittal, whether the submittal has been approved, whether the request for payment has been approved, and/or whether payment has been made.

Although described in the embodiment above as a standalone application, system 10 of the instant invention may also be utilized in combination with additional software applications now known or hereinafter discovered, including but not limited to the construction project management software and the bidding software applications of the prior art discussed in the Background section herein. In one preferred embodiment, system 10 is utilized in combination with a bidding system, such as the bidding system disclosed in U.S. application Ser. No. 11/370,343.

In an embodiment in which system 10 is utilized in combination with bidding system 10 general contractors will first utilize the bidding system to bid on and receive the contract to build a project. In one embodiment the bidding system and system 10 are contained on a hosted website. It will be appreciated that although located on a common hosted website the bidding system and system 10 may still operate as standalone applications in which the bidding system may be utilized without system 10 or vice versa. In a preferred embodiment, however, the bidding system of a hosted website is integrated with system 10 such that information and/or databases can be shared between the bidding system and system 10. For example, information from a bid request 220 in the bidding system of U.S. application Ser. No. 11/370,343 may be stored in the same database(s) or in interconnected databases that are utilized by system 10, such that the information from the bid request can ultimately be used in the submittal process without the need for reentry. In one such preferred embodiment, the my info 520 database is used to store information about the bid requester and the winning bidder. In such case the winning bidder would become the subscriber of system 10. The my info 520 database may be utilized for storing information from the bidding system, or alternatively the information about the bid requester and winning bidder may be transferred to the my info 520 database upon completion of the bidding process. Other information from the bid request (i.e. job specifications and drawings) and/or from the winning bid can be stored in the manage jobs database 530 or manage specs database 580 during the bidding process or otherwise transferred to those databases upon completion of the bidding process.

In several embodiments of the instant invention a back up system and/or other security features are utilized to increase reliability and user security. In one such embodiment a backup system includes a backup copy of all databases or other information stored in or by system 10. In this manner, all data/documentation stored, accessed and/or archived by system 10 is protected from loss. In a preferred embodiment, a backup copy of all databases is automatically made by system 10 on a daily basis, preferably during non-peak times (such as early morning or late night). In one embodiment in which system 10 includes an Internet Web site, continuously mirroring website servers may be hosted in a remote location to allow seamless operation of the website at all times. Additionally, continuously mirroring hard drive or drives may be configured into the same server to reduce server failures. Alternatively, website and/or user data can be periodically backed to a tape drive or similar media and stored on a remote location. In addition, a mirroring website could be deployed on a staging server (as opposed to production or live server) so that testing and other upgrades can be performed before making them available to end users on the live website server. In another embodiment of the instant invention, the system includes security features such as SSL server (or other security protocols or certification) and a back up system for the server to automatically back up data in real time.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the inventions is by way of example, and the scope of the inventions is not limited to the exact details shown or described.

Although the foregoing detailed description of the present invention has been described by reference to an exemplary embodiment, and the best mode contemplated for carrying out the present invention has been shown and described, it will be understood that certain changes, modification or variations may be made in embodying the above invention, and in the construction thereof, other than those specifically set forth herein, may be achieved by those skilled in the art without departing from the spirit and scope of the invention, and that such changes, modification or variations are to be considered as being within the overall scope of the present invention. Therefore, it is contemplated to cover the present invention and any and all changes, modifications, variations, or equivalents that fall with in the true spirit and scope of the underlying principles disclosed and claimed herein. Consequently, the scope of the present invention is intended to be limited only by the attached claims, all matter contained in the above description and shown in the accompanying drawings shall be interpreted as illustrative and not in a limiting sense.

Having now described the features, discoveries and principles of the invention, the manner in which the invention is constructed and used, the characteristics of the construction, and advantageous, new and useful results obtained; the new and useful structures, devices, elements, arrangements, parts and combinations, are set forth in the appended claims.

It is also to be understood that the following claims are intended to cover all of the generic and specific features of the invention herein described, and all statements of the scope of the invention which, as a matter of language, might be said to fall therebetween.

The invention claimed is:

1. A method of completing construction project submittal requirements including the steps of:
   storing a set of required specifications for materials necessary to meet design parameters for a construction project on a component of a computer network, said component of said computer network being controlled by a subscription service provider:
   submitting information to a submittal document stored on said component of said computer network, said submittal document including a set of actual material specifications to meet said set of required specifications for materials necessary to meet design parameters for the construction project;
   requesting submittal document required information, including said set of actual material specifications, from contributor access points connected to said computer network, said contributor access points having access to create and submit said submittal document;
   requesting approval by a responder through said computer network of said submittal document stored on said component of said computer network, said responder having read-only access to said submittal document and access to approve or disapprove said submittal document;

updating a submittal document as being completed upon receipt of an approval through said computer network from said responder; and archiving electronically completed submittal documents for future retrieval alter a construction project is completed.

2. The method of claim 1 wherein said computer network comprises the Internet.

3. The method of claim 1 wherein at least one of said access points is a PDA or other portable device.

4. The method as claimed in claim 3 further comprising the step of providing a limited set of capabilities to said PDA from a larger set of capabilities provided to other access points.

5. The method as claimed in claim 1 wherein said submittal document is in an xml format.

6. The method as claimed in claim 1 wherein said submittal document is selected from the group consisting of product data, samples, redline drawings, shop drawings, change orders, requests for information, requests for quotation, invoicing, prevailing wage rate reports, union wage rate reports and certification for payment.

7. The method as claimed in claim 1 further comprising the step of deducting a fee from a prepaid account for each approval that is requested for a submittal document.

8. The method as claimed in claim 7 further comprising the step of notifying a system user when said prepaid account falls below a threshold level.

9. The method as claimed in claim 1 further comprising the steps of:

submitting a request for payment through said computer network;

requesting approval through said computer network of said request for payment;

notifying a payor upon approval of said request for payment through said computer network; and completing payment by said payor for said request for payment.

10. The method as claimed in claim 9 further comprising the step of limiting access to said request for payment to specified users of said subscription service provider.

11. The method as claimed in claim 1 wherein said computer network includes a project bidding system that is controlled by said subscription service provider.

12. The method as claimed in claim 11 wherein information from said bidding system may be accessed for utilization in said submittal document.

13. The method as claimed in claim 11, wherein said bidding system utilizes a method for receiving bids comprising the steps of:

creating a bid request prior to said submitting step;
posting said bid request on said computer network;
receiving sealed electronic bids over said computer network;
storing said sealed bids unopened until a specified time;
essentially simultaneously opening all said sealed bids at an electronic bid opening accessible to bidders via said computer network.

14. A method of managing submittals for a construction project, said method comprising the steps of:

preparing a submittal containing requirements and/or specifications for at least a component of the construction project including a set of required specifications for materials necessary to meet design parameters for the construction project;

posting at least required specifications of the submittal at a central location controlled by a service provider;

accessing the submittal at the central location by a contributor to the submittal, the contributor having access to create and submit the submittal;

completing the submittal by the contributor by providing a set of actual material specifications to meet said set of required specifications;

updating the posting of the submittal to include the completed submittal at the central location;

approving the submittal by a responder having read-only access to said submittal document and access to approve or disapprove the submittal and updating the posting upon receipt of approval by said responder to include the approved submittal at the central location as completed; and archiving electronically completed submittal documents for future retrieval after a construction project is completed.

15. The method as claimed in claim 14 further comprising the step of notifying the contributor electronically of the posting, and/or updating, of the submittal at the central location.

16. The method as claimed in claim 15 wherein said step of notifying the contributor comprises automatically sending an email message upon achievement of said step of posting, and/or updating, the submittal at the central location.

17. The method as claimed in claim 14 wherein said contributor comprises a subcontractor on the construction project.

18. The method as claimed in claim 14 wherein said step of preparing the submittal is performed by a prime contractor on the construction project.

19. The method as claimed in claim 14 wherein said steps of posting and updating are accomplished electronically.

20. The method as claimed in claim 19 wherein said steps of electronically posting and updating are accomplished on an Internet website.

21. The method as claimed in claim 14 further comprising the step of storing a submittal history, said submittal history including information on when specific submittal information was updated and who was responsible for responding to the submittal and any resulting impact on the schedule of the construction project.

22. The method as claimed in claim 21 wherein said submittal history is maintained beyond completion of the construction project.

23. The method as claimed in claim 21 wherein said submittal history includes submittal information.

24. The method as claimed in claim 14 further comprising the step of tracking submittal information.

25. The method as claimed in claim 24 wherein said step of tracking submittal information comprises the step of updating a submittal history archive.

26. A method of managing submittals for a construction project, said method comprising the steps of:

storing information regarding a submittal document on a component of a computer network, said component of said computer network being controlled by a subscription service provider, said submittal document including a set of actual material specifications to meet a set of required specifications for materials necessary to meet design parameters for the construction project;

storing information regarding system users on another component of a computer network, said another component of said computer network being controlled by said subscription service provider;

receiving submittal document required information, including said set of actual material specifications, from at least one system user via an access point connected to said computer network, said access point having access to create and submit said submittal document;

requesting approval by an other system user through said computer network of said submittal document stored on said component of said computer network, said other system user having read-only access to said submittal document and access to approve or disapprove said submittal document;

archiving electronically completed submittal documents for future retrieval after a construction project is completed; and archiving information regarding when said submittal document was updated and who updated.

* * * * *